/ Patented Dec. 15, 1970

3,547,653
PROCESS FOR ROASTING GREEN COFFEE BEANS

Henry Haley Hixson, Chicago, Ill.; Jane S. Hixson, administrator of said Henry Haley Hixson, deceased
No Drawing. Filed Aug. 14, 1967, Ser. No. 660,203
Int. Cl. A23f 1/02
U.S. Cl. 99—68　　　　　　　　　　　　　　　　7 Claims

ABSTRACT OF THE DISCLOSURE

A process for roasting green coffee beans which comprises roasting the beans to the desired roast conditions, quickly reducing the temperature of the roasted beans to a temperature in the range of about 180° F. to 280° F. with a gaseous medium inert to the coffee beans and applying a predetermined amount of water to the roasted beans at the reduced temperature, and the resulting product.

---

This invention relates to the roasting of green coffee beans and, more particularly, to a process for roasting green coffee beans which reduces the shrinkage of the coffee bean to a minimum and at the same time provides a superior flavor when the roasted coffee is brewed.

As conventionally practiced green coffee beans having a moisture content in the range of about 5 to 15% by weight are heated in a roaster such as a Jabez Burns roaster for a period of about 5 or 10 minutes to 20 or 30 minutes. To quench or check the roast so that exothermic reactions do not take place that burn or otherwise degrade the roasted beans, it is necessary to quickly cool the beans by application of a cooling medium such as air, water or other means. While air is suitable, it is customary to utilize a water spray of about one gallon of water per one hundred pounds of green coffee beans that have been roasted because of the shrinkage that is associated with the roasting process. The use of cool water as the medium allows a portion of the water to be taken up by the green beans to thereby decrease the amount of shrinkage. Any decrease in the amount of shrinkage is desirable because of the concomitant increase in the economy. Conventional processes typically result in a shrinkage of 15% or more based upon the weight of the green coffee beans.

The rapid quenching of the roasted coffee beans with water spray while resulting in a slight decrease in shrinkage also results in the formation of a considerable amount of steam that must be vented to the atmosphere. While not wishing to be held to this explanation, it is theorized that the formation of steam is also accompanied by the volatilization of certain portions of the roasted coffee beans such as oils or other ingredients to the atmosphere creates a possible pollution problem in addition to the rather unpleasant odor.

It is a general aim of the present invention to provide a process for roasting green coffee beans which reduces to a practical minimum the shrinkage that occurs in the coffee beans.

A related object of this invention is the provision of a process for roasting green coffee beans which provides a product with a superior flavor when brewed.

A further object is to provide a process of the above-described type which forms a product that yields an increased number of cups per pound of brewed coffee.

Another aspect of this invention includes providing a process for roasting green coffee beans of the above-described type which minimizes any pollution or odor problems associated with the roasting method.

Other objects and advantages of the invention will become apparent as the following description proceeds.

While the invention is susceptible of various modifications and alternative forms, specific embodiments thereof have been shown by way of example and will herein be described in detail. It should be understood, however, that it is not intended to limit the invention to the particular examples disclosed, but, on the contrary, the invention is to cover all modifications, equivalents and alternatives falling within the spirit and scope of the invention. For example, while the invention will be described in connection with a batch-type operation, it should be understood that the invention is fully applicable to any continuous roasting process.

In carrying out the roasting of green coffee beans the beans generally have a moisture content in the range of about 5 to 15% by weight. They are roasted in a conventional roaster at a temperature in the range of 400° F. to 500° F. for a period of time sufficient to allow the beans to assume the particular shade or color that indicates that the desired roast has been achieved. The timing depends on many variables and will generally be in the range of about 10 to about 30 minutes.

In accordance with the present invention, the roasting of the green beans is quickly checked by rapidly cooling the temperature of the hot beans to a temperature intermediate the point at which roasting of the beans will no longer continue and the ambient temperature, preferably above 100° F., by applying a substantially dry medium that is inert with respect to the roasted coffee beans such as air. The partially cooled roasted beans are then sprayed with a predetermined amount of water sufficient to provide a shrinkage in the range of from about 4 to about 12% based upon the weight of the green coffee beans and allowed to cool. The commercial coffee product can then be made by employing conventional techniques to grind the coffee beans. Suitably the temperature to which the roasted beans can be reduced is 180° F. to 280° F.

In the preferred embodiment the temperature of the roasted beans is quickly reduced to a range of from about 180° F. to about 230° F. by contact with air at which point about one gallon to about one and one-half gallons of water per 100 pounds of the green coffee beans is sprayed on to the roasted beans.

In carrying out the novel method of the present invention the green coffee beans are placed in a conventional roaster such as a Jabez Burns roaster and roasted to the desired shade and color at a temperature in the range of 400° to 500° F., 425° to 480° F. being the preferred range. After the green beans have been roasted as desired, the hot and roasted beans are immediately discharged into a second Jabez Burns roaster that has not been heated and is provided with a water spray and temperature control means. The temperature of the roasted and hot beans is quickly reduced to a temperature in the range of 180° F. to 280° F. by employing the draft from the exhaust fans that are associated with conventional roasters so that cool air is passed through the roasted coffee beans. There is, accordingly no steam formed that could carry off volatile portions of the roasted beans. This is in contrast with the customary procedure of checking the roast with water which results in the venting to the atmosphere of large amounts of steam together with certain portions of the roasted beans such as oils and other volatile ingredients. Air is probably the most economical because a conventional roaster can be adapted to provide the necessary cooling. However, any substantially dry gaseous medium can be used which does not form steam or any other volatile stream at the operating conditions. Upon reaching the desired reduced temperature the water spray is begun and a predetermined amount of water is sprayed upon the roasted beans. After a brief absorption period of about 1 to about 10 minutes the roasted beans can be further cooled by opening the draft and allowing the exhaust fans to again draw air through the beans. Conventional grinding means can then be used to form a commercial coffee product that has a superior flavor when brewed and yields more cups per pound of roasted coffee.

In accordance with one aspect of the present invention improved grinding characteristics for the coffee beans formed by the novel method of this invention can be obtained by, prior to grinding, cooling the roasted beans to freeze the moisture contained in the roasted beans. Since it is not unusual for the grinding rolls on a conventional coffee mill to reach a temperature as high as 180° F. after two hours of continuous use, the feature of employing these cooled beans aids in eliminating the heat developed from the grinder and reduces any tendency on the part of the volatile coffee oils or other aromatic elements in the roasted beans that might be affected by the hot grinder rolls to be degraded or dissiapated. This cooling procedure is particularly advantageous when the shrinkage has ben reduced to the absolute minimum.

A further understanding of the novel method of this invention can be obtained from the following examples.

EXAMPLE 1

Using a conventional Jabez Burns roaster, four roasts of an identical blend of green coffee weighing 528 pounds per roast, were carried out. The first was used as a control lot and the roasting and cooling employed conventional practices. Thus, upon reaching the desired temperature of 478° F., the roasting flame of the burner was cut off and one gallon of water per 100 pounds of green coffee was sprayed on the hot beans to check and quench the roast. The batch was then discharged into a Stirflex cooler and cooled with air. The control lot was then weighed with the shrinkage being 14½% based upon the weigth of the original green coffee beans.

The number 2, 3 and 4 lots were each roasted in a manner identical to the first lot. Upon reaching the desired temperature, the hot beans were immediately discharged into a second cold Jabez Burns roaster equipped with a water spray and temperature controls. The second lot was cooled from 478° F. to 280° F., while lot 3 was cooled to 230° F. and lot 4 was cooled to 180° F. by opening the draft and having the exhaust fans draw air through the coffee beans.

Water at the rate of one gallon of water per hundred pounds of green beans was added with 3 to 5 minutes time being allowed as an absorption period. These lots were then further cooled by opening the draft on the Burns roaster and allowing the exhaust vents to pull air through the roasted beans. The lots were then weighed.

Table 1 on the following page demonstrates the shrinkage, i.e. the loss and weight based upon the original weight of the green coffee, for each of the four lots.

TABLE 1

| Lot: | Shrinkage, percent |
| --- | --- |
| 1 | 14½ |
| 2 | 12.3 |
| 3 | 10.4 |
| 4 | 9.7 |

The controlled lot 1 had a distinct smoky aroma while the other three lots displayed a soft and pleasant coffee aroma. After brewing the above lots and comparing the control lot to the other lots, lots 2, 3, and 4 were found to have a smoother more desirable taste and provided a significantly increased number of cups of coffee per pound of brewed coffee.

EXAMPLE 2

The same blend of coffee as used in Example 1 was employed to form four additional lots. The roasting procedure was identical to that used in Example 1. After the coffee had been roasted, the four lots, i.e. 5 through 8, were each transferred immediately into a second cold Jabez Burns roaster as in Example 1. The lots were cooled to the temperatures set forth in Table 2 by the operation of the exhaust fans as described in Example 1.

At this point the water was sprayed onto the roasted coffee beans at the rate of 1½ gallons per 100 pounds of green coffee with a seven minute absorption being used. The coffee was then weighed.

TABLE 2

| Lot | Temperature to which beans were cooled before water added, ° F. | Shrinkage, weight percent based on the weight of the green coffee |
| --- | --- | --- |
| 5 | 280 | 13.05 |
| 6 | 230 | 10.35 |
| 7 | 200 | 9.85 |
| 8 | 180 | 6.04 |

When brewed and compared with the control lot 1, the taste of the other lots were superior to that of No. 1.

The particular amount of water that is sprayed on the roasted coffee beans can be varied within certain defined limits. A greater decrease in shrinkage is obtained by adding greater amounts of water; however, the taste of coffee brewed from the roasted and ground coffee is superior when an amount in the range of about one gallon per 100 pounds of coffee to about 1½ gallons is used.

To obtain an optimum balance between flavor requirements and economical considerations it is desirable to vary the temperature to which the roasted beans are first cooled and the amount of water that is first added so that a shrinkage in the range of about 6 to 12 percent by weight is maintained. Above 12 percent the economical aspects of the method come into play while decreasing the shrinkage below the 6 percent begins to seriously impair the flavor of the coffee.

Thus, the novel process of this invention provides a means of significantly reducing the amount of shrinkage that results in roasting the green coffee beans and also provides a superior flavor. An additional economic benefit from the process of this invention is the increased number of cups of coffee per pound of coffee that results when the roasted product of this invention is brewed. Also minimized are any problems associated with pollution and odor caused by conventional practices in which a portion of the water used to quench and check the roast is transformed into steam which is then vented to the atmosphere carrying with it a certain of the volatilized oils and other ingredients of the roasted coffee beans.

What is claimed is:

1. A process for roasting green coffee beans to decrease the shrinkage which comprises roasting the green coffee beans at a preselected temperature and for a period of time sufficient to achieve the desired roast, quickly reducing the temperature of the roasted beans to a temperature in the range of about 180° F. to 280° F. with a substantially dry gaseous medium inert to the coffee beans, and which does not form steam or any other volatile stream when added to the roasted beans, and applying a predetermined amount of water to the roasted beans at the reduced temperature.

2. The process of claim 1 wherein the temperature is quickly reduced to a temperature in a range of from about 180 to about 230° F. and an amount of water in the range of from about one gallon to about one and one half gallons of water per 100 pounds of green coffee is added to the roasted beans at the reduced temperature.

3. The process of processing green coffee beans to decrease shrinkage and to improve the flavor of coffee brewed from the finished ground product comprising the steps of roasting the green coffee beans at a temperature and time period sufficient to achieve a desired roast, quickly reducing the temperature of the roasted beans to a temperature in the range of about 180° F. to 280° F. with a substantially dry gaseous medium inert to the coffee beans, and which does not form steam or any other volatile stream when added to the roasted beans, and spraying a predetermined amount of water on the roasted beans at the reduced temperature.

4. The process of processing green coffee beans to decrease shrinkage and to improve the flavor of coffee brewed from the finished ground product comprising the steps of roasting the green coffee beans at a temperature and the time period sufficient to achieve a desired roast, quickly reducing the temperature of the roasted beans with a substantially dry, inert gaseous medium which does not form steam or any other volatile stream when added to the roasted beans, to a temperature intermediate the point below which roasting of the coffee beans will continue and ambient temperature and applying a predetermined amount of water on the roasted beans at the reduced temperature such that the shrinkage of the roasted beans is in the range of from about 4 to about 12%, based upon the weight of the green beans.

5. The process of claim 4 wherein the temperature of the roasted beans is quickly reduced to a temperature intermediate the point below which roasting will continue and 100° F.

6. The process of claim 4 wherein the temperature to which the roasted beans is quickly reduced to is in the range of from about 200° F. to 100° F.

7. The process of claim 6 wherein the shrinkage of the roasted beans is within the range of from about 6 to 12% based upon the weight of the green beans.

References Cited

UNITED STATES PATENTS

| | | | |
|---|---|---|---|
| 1,911,763 | 5/1933 | Maede | 99—68 |
| 2,099,945 | 11/1937 | Simpson | 99—68 |
| 2,632,706 | 3/1953 | Montgomery | 99—68 |
| 3,345,181 | 10/1967 | Smith | 99—68 |
| 3,445,247 | 5/1969 | Baerwald | 34—5 |

FRANK W. LUTTER, Primary Examiner

W. L. MENTLIK, Assistant Examiner